United States Patent
Montigny et al.

(10) Patent No.: US 10,280,845 B2
(45) Date of Patent: May 7, 2019

(54) VALVE DEVICE IN A MOTOR VEHICLE

(71) Applicant: Continental Automotive GmbH, Hannover (DE)

(72) Inventors: Rainer Johannes Montigny, Bad Soden (DE); Stefan Kopp, Bruchkoebel (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/536,922

(22) PCT Filed: Dec. 15, 2015

(86) PCT No.: PCT/EP2015/079800
§ 371 (c)(1),
(2) Date: Jun. 16, 2017

(87) PCT Pub. No.: WO2016/096863
PCT Pub. Date: Jun. 23, 2016

(65) Prior Publication Data
US 2017/0370299 A1    Dec. 28, 2017

(30) Foreign Application Priority Data
Dec. 19, 2014   (DE) ........................ 10 2014 226 728

(51) Int. Cl.
| F02D 31/00 | (2006.01) |
| F16K 31/44 | (2006.01) |
| F02D 9/10 | (2006.01) |
| H01M 8/04089 | (2016.01) |
| H01M 8/04082 | (2016.01) |

(Continued)

(52) U.S. Cl.
CPC ......... F02D 9/1015 (2013.01); F02D 9/1005 (2013.01); F02D 9/108 (2013.01);
(Continued)

(58) Field of Classification Search
CPC ...... F02B 27/0273; F02D 9/08; F02D 9/1005; F02D 9/101; F16K 1/2057; F16K 1/2263;
(Continued)

(56) References Cited

U.S. PATENT DOCUMENTS

| 4,438,745 A | 3/1984 | Watanabe |
| 4,507,025 A * | 3/1985 | Fedor .................... B23Q 11/04 |
| | | 408/11 |

(Continued)

FOREIGN PATENT DOCUMENTS

| CN | 102537379 | 7/2012 |
| CN | 103807452 | 5/2014 |

(Continued)

OTHER PUBLICATIONS

Office Action dated Dec. 20, 2017 which issued in the corresponding Korean Patent Application No. 10-2017-7016712.

*Primary Examiner* — John Kwon
(74) *Attorney, Agent, or Firm* — Cozen O'Connor

(57) ABSTRACT

A valve device includes: a housing; a flow channel extending in the housing; a shaft mounted rotatably in the housing, and having a screw bore having a shoulder; a flap, fastened to the shaft, the flap influencing a flow cross section in the flow channel; a screw having a collar, the screw fixedly attaching the flap to the shaft; a drive driving the flap via the shaft; and a valve seat in the flow channel, the valve seating having a seal arranged on a radially circumferential edge of the flap, the seal being in contact with the valve seat in a closed position of the flap such that the shaft penetrates the flap at an angle. The collar contacts the shoulder such that, when the screw is tightened firmly, a transmission of force from the collar to the shaft takes place via the shoulder.

3 Claims, 2 Drawing Sheets

(51) Int. Cl.
*F16K 1/22* (2006.01)
*F02D 11/04* (2006.01)
*F02D 9/08* (2006.01)
*H01M 8/04186* (2016.01)

(52) U.S. Cl.
CPC .............. *F02D 11/04* (2013.01); *F16K 1/222* (2013.01); *H01M 8/04089* (2013.01); *H01M 8/04201* (2013.01); *H01M 8/04186* (2013.01)

(58) Field of Classification Search
CPC .................. B23P 19/04; F02M 61/168; B29L 2031/7506
USPC ........ 123/337, 403; 251/305, 306, 357, 358; 29/890.12, 890.124, 890.126, 890.127
See application file for complete search history.

(56) References Cited

U.S. PATENT DOCUMENTS

| | | | |
|---|---|---|---|
| 4,836,499 A | 6/1989 | Steele | |
| 5,098,064 A | 3/1992 | Daly et al. | |
| 5,730,428 A * | 3/1998 | Sulzyc | B60G 17/0525 267/64.16 |
| 5,957,669 A * | 9/1999 | Parikh | F04B 9/02 417/362 |
| 6,415,958 B1 * | 7/2002 | Donley | B05B 12/00 222/146.5 |
| 2010/0263365 A1 * | 10/2010 | Rehtanz | F16D 3/185 60/469 |
| 2015/0219134 A1 | 8/2015 | Yamaguchi | |
| 2017/0363018 A1 * | 12/2017 | Montigny | F02D 9/1025 |

FOREIGN PATENT DOCUMENTS

| | | |
|---|---|---|
| DE | 10 2008 018494 A1 | 10/2009 |
| EP | 0 307 733 A2 | 3/1989 |
| EP | 1705409 | 9/2006 |
| JP | H 01-126476 | 5/1989 |
| JP | H09-229207 | 9/1997 |
| JP | 2014-066306 | 4/2014 |

\* cited by examiner

VALVE DEVICE IN A MOTOR VEHICLE

CROSS-REFERENCE TO RELATED APPLICATIONS

This is a U.S. national stage of application No. PCT/EP2015/079800 filed on 15 Dec. 2015, which claims priority to the German Application No. 10 2014 226 728.5 filed 19 Dec. 2014, the content of both incorporated herein by reference.

BACKGROUND OF THE INVENTION

1. Field of the Invention

The invention relates to a valve device for a fuel cell arrangement in a motor vehicle, having a flow channel that extends in a housing, a flap that influences the flow cross section, and a drive that drives the flap. The flap is fastened to a shaft and the shaft is mounted rotatably in the housing. A valve seat is arranged in the flow channel, has a seal arranged on a radially circumferential edge of the flap, and is in contact with the valve seat in the closed position of the flap such that the shaft penetrates the flap at an angle.

2. Related Art

Valve devices have long been known. On account of the flowing media, e.g., air, the actuating elements of valves have to provide a high degree of tightness when the flow channel is closed. Moreover, the actuating elements should ensure good controllability of the flow cross section of the flow channel and thus of the mass flow of the flowing medium. In particular with regard to the tightness, conventional valve arrangements, known as throttle flap adjusters, have a disadvantage since, depending on type, the tightness requirements in fuel cell applications are 10 to 20 times higher than for other applications. As a result, such valve devices are of a complex construction and therefore relatively costly.

A firm fit of the flap on the shaft throughout the lifetime of these elements is a basic requirement for sufficient tightness when the flow channel s closed. To this end, it is known to screw the flap, composed of plastic, to the metal shaft. If pressure is applied to the flap when the screw head is tightened, this leads to the plastic of the flap flowing over time due to the pressing force, which can lead to the screw connection loosening and, in the worst case, detaching. In order to prevent this, a metal sleeve is fitted in the flap bore for the screw, so that the force of the screw is accommodated by the sleeve and not by the plastic of the flap. A disadvantage of this is the complex fitting of the sleeve together with the extra costs.

SUMMARY OF THE INVENTION

An object of the invention is therefore to provide a valve device that is of a relatively simple construction and that at the same time ensures a reliable screw connection throughout the lifetime of the valve device.

This object may be is achieved according to an aspect of the invention in that the screw has a collar, the flap shaft has a screw bore with a shoulder, and the collar of the screw comes into contact with the shoulder of the shaft such that, when the screw is tightened firmly, the transmission of force from the collar takes place via the shoulder.

As the transmission of force now takes place mainly from the screw directly into the shaft, the pressing of the screw head against the plastic flap is considerably reduced. On account of this strongly reduced introduction of force into the plastic flap, the flowing of the flap material, and thus the detachment of the screw connection, are reliably prevented. The screw head presses the plastic flap against the shaft only to a small extent, which is sufficient for a reliable firm fit of the flap on the shaft. The advantage is that no additional parts are required for the connection according to the invention, which leads to a low-cost device. At the shaft, only one further processing step for producing the shoulder is necessary, while the screw has to have an additional collar.

In order to further minimize the expenditure for the production of the collar and of the shoulder, it has proven to be advantageous to select the depth to the shoulder smaller than the shaft radius. Here, the weakening of the shaft is reduced to a minimum if the depth of the shoulder is 0.2 to 0.5 times the shaft radius.

BRIEF DESCRIPTION OF THE DRAWINGS

The invention will be described in more detail on the basis of an exemplary embodiment. In the figures.

DETAILED DESCRIPTION OF THE PRESENTLY PREFERRED EMBODIMENTS

Figure 1:
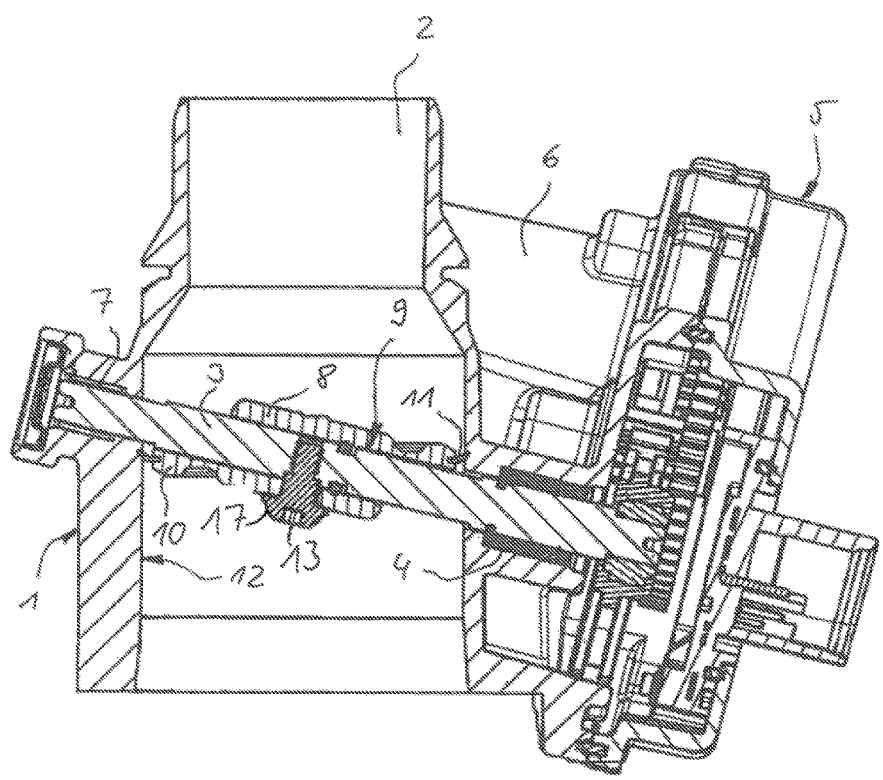
FIG. 1 shows a valve device according to an embodiment of the invention.

The valve device for a motor vehicle in FIG. 1 includes a housing 1, having a flow channel 2, which is arranged in the housing, for the through-flow of a fluid. In the present case, an air flow through the valve device is controlled. In the flow channel 2, there is arranged a shaft 3 mounted on both sides in the housing 1. A first bearing 4 is situated on that side of the housing 1 on which a gear mechanism 5 is arranged. The gear mechanism 5 is connected on the output side to the shaft 3, and on the input side to an electric motor (not shown) which is housed in a separate chamber 6 of the housing 1. A second bearing 7 for the shaft 3 is situated on that side of the flow channel 2 opposite to the gear mechanism 5. On the shaft 3, there is arranged a flap 8, which has a bore 9 through which the shaft 3 extends. The flap 8 is fastened to the shaft 3 by being screwed to the shaft 3 with a screw 13. The flap 8 further has a radially circumferential edge 10 on which there is arranged a seal 11. In the illustration shown in FIG. 1, the flap 8 is in the closed position, such that the seal 11 interacts with the region of the flow channel 2 acting as a valve seat 12 and completely closes the flow channel 2.

Figure 2:
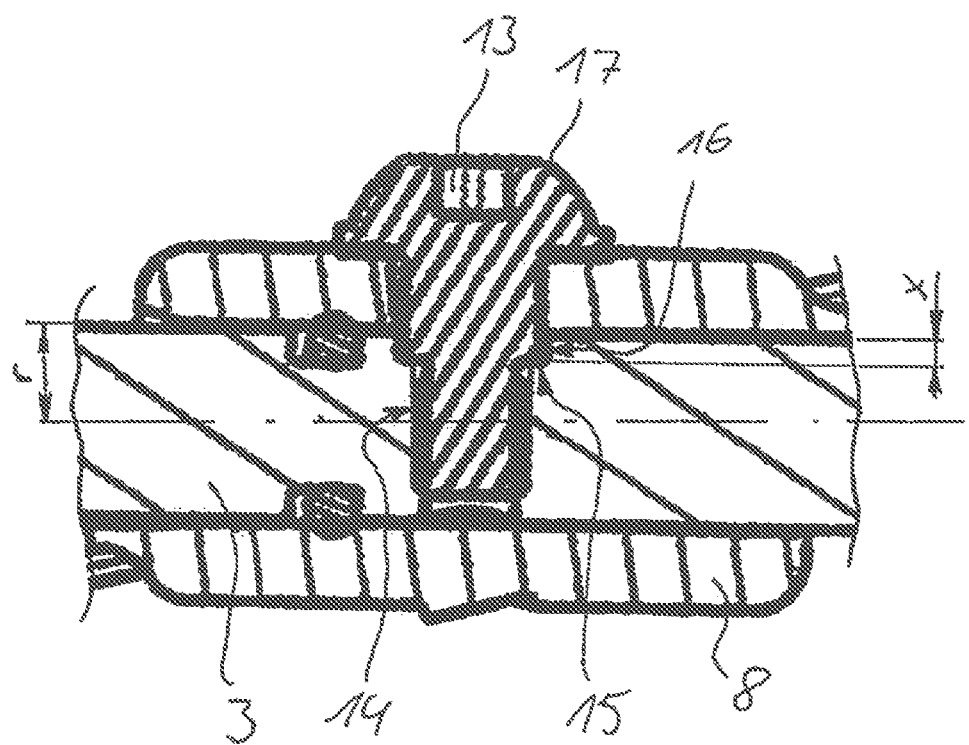
FIG. 2 is an enlarged illustration of the screw connection.

FIG. 2 shows the shaft 3 with part of the flap 8. The shaft 3 has a bore 14 for the screw 13. The bore 14 has a shoulder 15. The screw 13 has a collar 16 which, in the fitted state, bears on the shoulder 15. The screw head 17 thereby presses against the flap 8 to such a small extent that the flap is reliably held but a flow of the plastic due to too high a contact pressure is avoided. The shoulder 15 has a depth x from the shell surface of the shaft 3 which is approximately 0.3 of the shaft radius r.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve device for a fuel cell arrangement in a motor vehicle, the valve device comprising:
    a housing;
    a flow channel that extends in the housing;
    a shaft mounted rotatably in the housing in a longitudinal direction, the shaft having an outer surface and, a screw bore extending inwardly from the outer surface, the screw bore having an interior shoulder arranged inwardly from the outer surface of the shaft;
    a flap fastened to the shaft, the flap being configured to influence a flow cross section in the flow channel;
    a screw having a head having a peripheral portion thereof having, at the peripheral portion of the head, a first collar, and, arranged inwardly of the first collar, a second collar arranged below the head, the screw being configured to fixedly attach the flap to the shaft by threadingly engaging with the screw bore of the shaft;
    a drive configured to drive the flap via the shaft; and
    a valve seat arranged in the flow channel, the valve seating having a seal arranged on a radially circumferential edge of the flap, the seal being in contact with the valve seat in a closed position of the flap such that the shaft penetrates the flap at an angle,
    wherein the screw and the shaft are structured and arranged such that when the screw is tightened in the screw bore of the shaft, the first collar of the screw contacts, and is arranged radially outside of, an outer surface of the flap, and the second collar of the screw bears against the interior shoulder of the screw bore of the shaft such that a transmission of force from the second collar of the screw to the shaft takes place via the interior shoulder of the screw bore.

2. The valve device as claimed in claim 1, wherein a depth x to the interior shoulder of the screw bore is smaller than a shaft radius r.

3. The valve device as claimed in claim 2, wherein the depth x of the interior shoulder is 0.2 to 0.5 times the shaft radius r.

* * * * *